United States Patent
Fuller (10) Patent No.: US 10,719,971 B2
(45) Date of Patent: Jul. 21, 2020

(54) LOW RESOLUTION DEPTH PRE-PASS

(71) Applicant: Microsoft Technology Licensing, LLC, Redmond, WA (US)

(72) Inventor: Martin Jon Irwin Fuller, Warwick (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/989,367

(22) Filed: May 25, 2018

(65) Prior Publication Data

US 2019/0362533 A1    Nov. 28, 2019

(51) Int. Cl.
*G06T 15/00* (2011.01)
*G06T 3/40* (2006.01)

(52) U.S. Cl.
CPC .............. *G06T 15/005* (2013.01); *G06T 3/40* (2013.01); *G06T 2200/04* (2013.01); *G06T 2200/28* (2013.01)

(58) Field of Classification Search
CPC ...................................................... G06T 15/40
See application file for complete search history.

(56) References Cited

U.S. PATENT DOCUMENTS

| | | | | |
|---|---|---|---|---|
| 5,509,110 A | * | 4/1996 | Latham | G06T 15/405 345/421 |
| 6,603,474 B1 | * | 8/2003 | Cobb | G06T 15/40 345/421 |
| 7,023,437 B1 | * | 4/2006 | Voorhies | G06T 15/005 345/419 |
| 7,952,579 B1 | * | 5/2011 | Greene | G06T 15/405 345/419 |
| 2003/0122851 A1 | * | 7/2003 | Doyle | G06T 15/005 345/620 |
| 2006/0164414 A1 | * | 7/2006 | Farinelli | G06T 15/40 345/422 |
| 2008/0211810 A1 | * | 9/2008 | Falchetto | G06T 15/40 345/422 |

(Continued)

OTHER PUBLICATIONS

"International Search Report and Written Opinion Issued in PCT Application No. PCT/US19/031938", dated Jul. 8, 2019, 12 Pages.

(Continued)

*Primary Examiner* — Phong X Nguyen
(74) *Attorney, Agent, or Firm* — Arent Fox LLP (57) ABSTRACT

Examples described herein relate to rendering a full resolution image using a reduced resolution depth pre-pass to pre-populate depth data for culling. A computing device may include a memory, a graphics processing unit (GPU) including a hierarchical depth buffer or full resolution depth data, and at least one processor. The computer device may render an occlusion geometry at a reduced resolution. The computer device may be configured to sample a depth value of pixels of the occlusion geometry. The computer device may pre-populate the GPU depth data based on the sampled depth values. The computer device may cull at least one tile or pixel from a full resolution rendering process in response to a depth of the at least one tile or pixel being further than a corresponding depth value in the GPU depth data. The computer device may perform the full resolution rendering process on remaining tiles or pixels.

17 Claims, 8 Drawing Sheets

(56) References Cited

U.S. PATENT DOCUMENTS

| | | | | |
|---|---|---|---|---|
| 2014/0009382 | A1* | 1/2014 | Chou | G06F 3/017 |
| | | | | 345/156 |
| 2014/0098096 | A1* | 4/2014 | Bavoil | G06T 15/04 |
| | | | | 345/422 |
| 2014/0169701 | A1* | 6/2014 | Cui | G06T 3/4053 |
| | | | | 382/299 |
| 2014/0375637 | A1* | 12/2014 | Heggelund | G06T 15/40 |
| | | | | 345/421 |
| 2015/0109293 | A1* | 4/2015 | Wang | G06T 1/60 |
| | | | | 345/422 |
| 2016/0086299 | A1 | 3/2016 | Sharma et al. | |
| 2017/0352182 | A1* | 12/2017 | Wang | G06T 15/005 |
| 2018/0033184 | A1* | 2/2018 | Jin | G06T 15/40 |

OTHER PUBLICATIONS

Zhang, et al., "Visibility Culling Using Hierarchical Occlusion Maps", In Proceedings of the 24th Annual Conference on Computer Graphics and Interactive Techniques, Aug. 7, 1997, pp. 77-88.

* cited by examiner

LOW RESOLUTION DEPTH PRE-PASS

BACKGROUND

The present disclosure relates to a computer graphics system, and more particularly, to rendering images including objects at different depths.

A computer graphics system may render an image based on multiple objects from a perspective of a camera. As in the real world, when virtual objects are viewed from a particular perspective, other objects may block (or occlude) the view of all or a portion of the object. Generally, a closer object will occlude a more distant object. In a computer graphics system, overdraw occurs when a closer object is drawn using pixels that already include another object. The existing pixels are replaced with pixels for the closer object. Generally, overdrawing is considered wasteful because the properties of each overdrawn pixel are determined multiple times, using additional processing resources.

One solution to reduce or eliminate overdraw is the use of a depth pre-pass, which is available on modern graphics processing units (GPU). In this scheme each object is rendered twice. In the first iteration, only the per-pixel nearest depth is recorded to the depth buffer. In the second iteration, only the nearest object will pass the depth buffer test and write pixel data. This avoids overdraw, but at the expense of processing every object twice. This expense can sometimes outweigh the benefit of eliminating overdraw resulting in a net loss.

Another solution to reducing overdraw is to perform a low resolution occlusion render, typically using the central processing unit (CPU). Low resolution occlusion geometry is rendered to an occlusion buffer, for example, a box for a building or rectangles for a wall or fence. This occlusion render is used to test a single bounding volume for each object, typically a box. If the entire bounding box is occluded, the software may prevent rendering of the object. Often, however, objects may be only partially occluded, so software occlusion render may still render the entire object, resulting in rendering many pixels that are occluded and which are later overdrawn.

Thus, there is a need in the art for improvements in graphics processing for determining whether to render pixels.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, a method of rendering an image at a full resolution includes rendering an occlusion geometry at a reduced resolution lower than the full resolution. The method may include sampling a depth value of pixels of the occlusion geometry. The method may include pre-populating GPU depth data (e.g., hierarchical depth buffer metadata) based on the sampled depth values. The method may include culling at least one tile or pixel from a full resolution rendering process in response to a depth of the at least one tile or pixel being further away than a corresponding depth value in the GPU depth data. The method may include performing the full resolution rendering process on remaining tiles or pixels to generate the image at the full resolution. The method may include displaying the image on a computer display at the full resolution.

In another example, a method of rendering an image at a full resolution includes rendering an occlusion geometry at a reduced resolution lower than the full resolution. The method may include sampling a depth value of pixels of the occlusion geometry. The method may include pre-populating a full resolution depth buffer based on the sampled depth values. The method may include culling at least one pixel from a full resolution rendering process in response to a depth of the at least one pixel being further away than a corresponding depth value stored in the pre-populated depth buffer. The method may include performing the full resolution rendering process on remaining pixels. This method may be used for example when there is no direct access to hierarchical depth buffer values, or when no hierarchical depth buffer is implemented on the current GPU.

In another example, a computing device for rendering an image at a full resolution may include a memory storing one or more parameters or instructions for executing an operating system and one or more applications. The computing device may include a graphics processing unit (GPU) for rendering frames of the one or more applications for display on a display device coupled to the computing device, the GPU including a depth buffer, with or without hierarchical depth. The computing device may include at least one processor coupled to the memory, and the GPU. The at least one processor may be configured to render an occlusion geometry at a reduced resolution lower than the full resolution. The at least one processor may be configured to sample a depth value of pixels of the occlusion geometry. The at least one processor may be configured to pre-populate metadata of the hierarchical depth buffer based on the sampled depth values, or pre-populate the full resolution depth values. The GPU may be configured to cull at least one tile or pixel from a full resolution rendering process in response to a depth of the at least one tile or pixel being further away than a corresponding depth value in the hierarchical depth metadata buffer or depth buffer. The GPU may be configured to perform the full resolution rendering process on remaining tiles or pixels to generate the image at the full resolution.

In another example, a computer-readable medium, may include code executable by one or more processors for rendering an image at a full resolution. The computer-readable medium may include code for rendering an occlusion geometry at a reduced resolution lower than the full resolution. The computer-readable medium may include code for sampling depth values of pixels of the occlusion geometry. The computer-readable medium may include code for biasing the sampled depth values toward another depth value, further from the camera. The computer-readable medium may include code for pre-populating hierarchical depth buffer metadata, or full resolution depth based on the biased depth values. The computer-readable medium may include code for culling at least one tile or pixel from a full resolution rendering process in response to a depth of the at least one tile or pixel being further away than a corresponding depth value in the hierarchical depth buffer metadata or depth buffer. The computer-readable medium may include code for performing the full resolution rendering process on remaining tiles or pixels to generate the image at the full resolution.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for drawing images on a display with relatively low latency (as compared to current solutions). In graphics intensive computer applications (e.g., video games), the user experience is usually improved by increasing the speed at which an image can be rendered by a particular system. For example, faster rendering may enable higher frame-rates, which the user perceives as smoother movement. As another example, faster rendering may enable use of a higher resolution, more effects, or more content while keeping the frame-rate constant.

In an implementation, for example, this disclosure provides systems and methods for performing a low resolution rendering of an image to determine a depth of visible pixels to be used for occlusion culling. The low resolution rendering may use far fewer resources than performing a full resolution rendering of the image. For example, a low resolution rendering at one eighth of the full resolution may use one sixty-fourth of the pixels. In an implementation, the low resolution pixels may correspond to tiles of the full-resolution image, so culling may occur at the tile level of granularity. Accordingly, by using the low resolution rendering to cull groups of pixels corresponding to occluded portions of objects from a full resolution rendering, the disclosed techniques may reduce resource usage (e.g., time and processing resources) for rendering the image.

One issue with using a reduced resolution rendering for occlusion culling is the possibility of undersampling. Because each pixel in the reduced resolution rendering may represent multiple pixels in the full resolution rendering, it is possible that a reduced resolution rendering may not capture some details of the objects. Of particular concern is the possibility that further or deeper features are not captured by sampling the reduced resolution depth rendering. For example, sampling concave surfaces at a low resolution may not capture the deepest point of the concave surface. If groups of features corresponding to the deeper features are improperly culled from the full resolution rendering due to the undersampling, the final image may include missing pixels, which may be noticeable to the user. Accordingly, the disclosure provides several techniques for biasing samples from the reduced resolution depth rendering to prevent improper culling.

Figure 1:
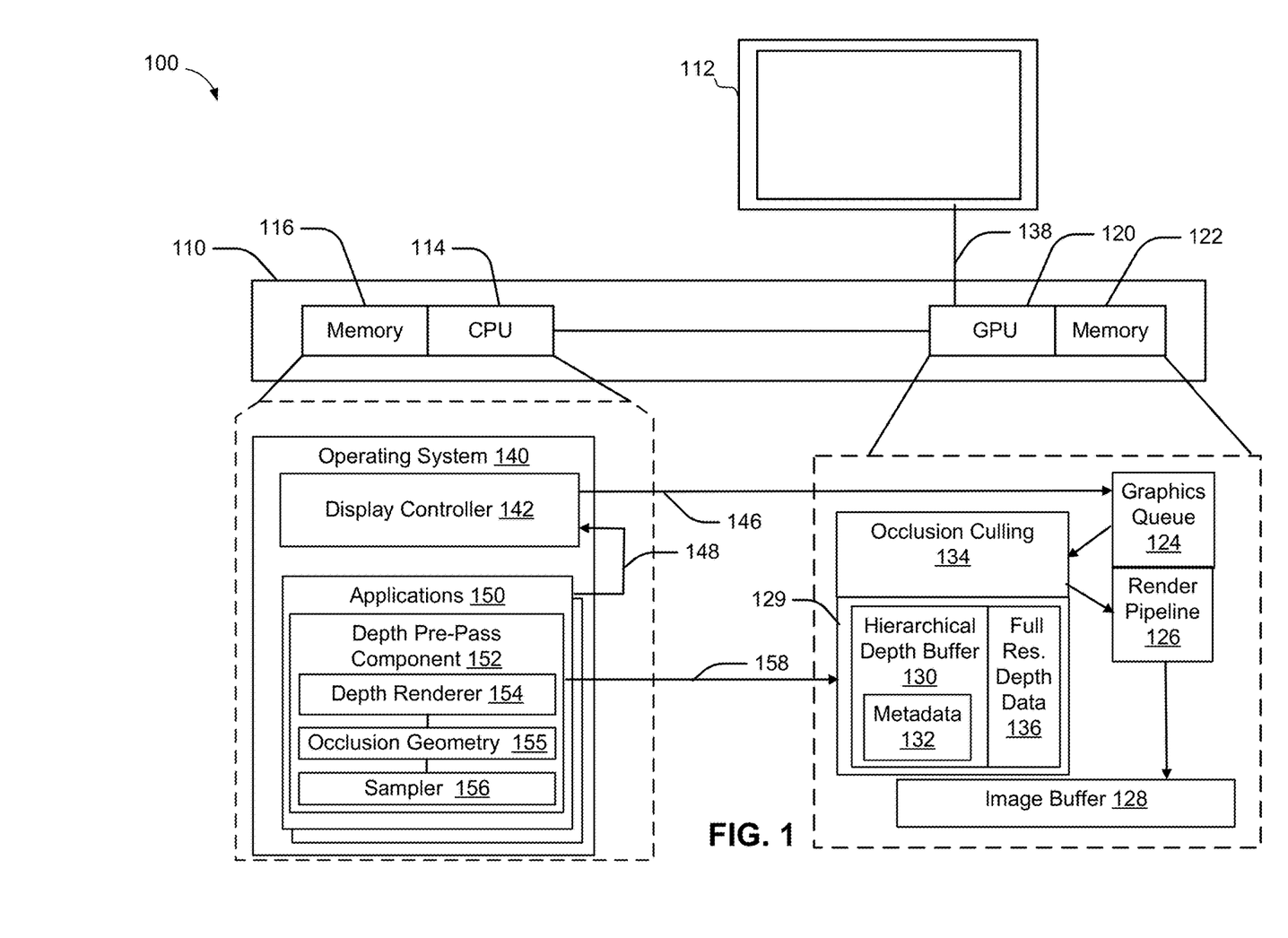
FIG. 1 is a schematic block diagram of an example system for culling occluded pixels from a graphics pipeline using a low resolution depth pre-pass, in accordance with an implementation of the present disclosure.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device. The computer device 110 may include a display 112 for displaying a rendered image. The display 112 may be periodically updated at a refresh rate (e.g., 30 Hz-90 Hz). The computer device 110 may provide images for display on the display 112 using a graphics processing unit (GPU) 120 including a graphics queue 124 for receiving commands to render objects in an image, an occlusion culling component 134 for culling groups of pixels based on a hierarchical depth buffer 130, and a render pipeline 126 for drawing remaining groups of pixels that are not culled.

The computer device 110 may also include a CPU 114 that executes instructions stored in memory 116. For example, the CPU 114 may execute an operating system 140 and one or more applications 150. The operating system 140 may include a display controller 142 to control the GPU 120. For example, the display controller 142 may send rendering commands to the GPU 120. In some cases, the display controller 142 may execute on the CPU 114 to generate a reduced resolution occlusion geometry 155.

Computer device 110 may include a memory 116 and CPU 114 configured to control the operation of computer device 110. Memory 116 may be configured for storing data and/or computer-executable instructions defining and/or associated with an operating system 140 and/or application 160, and CPU 114 may execute operating system 140 and/or applications 150. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit.

The operating system 140 may include instructions (such as application 150) stored in memory 116 and executable by the CPU 114. The operating system 140 may include a display controller 142 for controlling the GPU 120. For example, the display controller 142 may receive objects 148 from applications 150 and provide commands 146 to the GPU 120 to perform one or more specific graphics processing operations such as rendering source images or performing adjustments.

The GPU 120 may include one or more processors and specialized hardware for image processing. In an implementation, the GPU 120 may be integrated with a CPU 114 on a motherboard of the computer device or may be a discrete chip. The GPU 120 may include a dedicated memory 122. The GPU 120 may be connected to the display 112 via a display interface 138. The GPU 120 may periodically scan out an image from an image buffer 128 to the display 112 via the display interface 138 according to a refresh rate of the display 112. The GPU 120 may include a graphics queue 124, a render pipeline 126, a hierarchical depth buffer 130, and an occlusion culling component 134. The graphics queue 124 may receive commands from the display controller 142 for rendering an image. The graphics queue 124 may generally provide the commands to the render pipeline 126. The render pipeline 126 may perform multiple stages of image processing. For example, the render pipeline 126 may include an input-assembler stage, vertex shader stage, hull shader stage, tessellator stage, domain shader stage, geometry shader stage, stream output stage, rasterizer stage, pixel-shader stage, and output merger stage.

The GPU 120 may include GPU depth data 129 for storing depth data related to a full resolution rendering. For example, the GPU depth data 129 may include a hierarchical depth buffer 130, which may also be referred to as a hierarchical z buffer or HZB. The hierarchical depth buffer 130 may also include metadata 132, which may include additional information for groups of pixels. For example, the hierarchical depth buffer 130 and metadata 132 may include information for 8×8 groups of pixels referred to as tiles. The hierarchical depth buffer 130 contains the minimum and/or maximum depth values for the set of pixels contained in that tile. These minimum and maximum depth values may be conservatively quantized, for example using 14-bits or 16-bits, whereas full resolution depth data 136 may be stored using more bits, for example 32-bits. Accordingly, the hierarchical depth buffer 130 may have less precision than the actual GPU 120 calculations. The metadata 132 may also include a clear state bit and other data used to accelerate depth testing or clear operations. The hierarchical depth buffer 130 minimum and maximum depth values may be packed in with other values of metadata 132 to form complete machine words, for example 32 bits of data, or they may be stored separately.

The occlusion culling component 134 may be a hardware accelerator for culling pixels or tiles based on the hierarchical depth buffer 130. In a first pass, the occlusion culling component 134 may receive a tile and determine whether the tile is occluded based on the hierarchical depth buffer 130, for example, by comparing a depth range of the tile being rendered to the minimum and maximum depth values. In a second pass, if the tile passes occlusion culling, the occlusion culling component 134 may determine whether individual pixels are occluded based on the hierarchical depth buffer 130 and finally if necessary, testing individual pixels against the full resolution depth buffer. The implementation of the occlusion culling component 134 may vary based on the GPU 120 and may be transparent to an application 150 once the hierarchical depth buffer 130 and/or metadata 132 are populated.

In an example, display interface 138 can be communicatively coupled with the GPU 120 and/or memory 122 for communicating with the display 112. A display interface, as referred to herein, may also include various types of ports, including high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications between computer device 110 and display 112.

The applications 150 may include graphical components that involve rendering an image to the display 112. For example, the applications 150 may include video games that render a series of images to the display 112 at a frame-rate. Generally, application developers may seek to improve the user experience by maximizing frame-rate, resolution, color depth, or other image properties, or letting the user select such properties. One or more applications 150 may include a depth pre-pass component 152 for culling occluded groups of pixels from an image using a reduced resolution rendering prior to rendering the image at a full resolution. The depth pre-pass component 152 may include a depth renderer 154 for rendering an occlusion geometry 155 at a reduced resolution lower than the full resolution and a sampler 156 for pre-populating the GPU depth data 129 (e.g., the hierarchical depth buffer 130, metadata 132, or depth data 136) based on sampled depth values 158 of the occlusion geometry 155.

The depth renderer 154 may include instructions to perform a depth-only rendering of a scene to generate an occlusion geometry 155. The occlusion geometry 155 may have a lower resolution than the final full resolution image. For example, the lower resolution may be one-fourth, one-eighth, or less of the full resolution. The depth renderer 154 may instruct either the CPU 114 or the GPU 120 to perform the depth-only rendering. Since the depth-only rendering is performed at a lower resolution and may omit some processing intensive pixel level operations, both the CPU 114 and the GPU 120 may be able to quickly perform the depth-only rendering. An application designer may select whether the CPU 114 or the GPU 120 performs the depth-only rendering based on the particular needs of the application 150 and other work being performed on each of the CPU 114 or the GPU 120. The occlusion geometry 155 generated by the depth-only rendering may include a depth value for each pixel of screen space in the depth-only rendering. The depth value 158 may be the depth of the closest object/surface rendered. A greater depth value 158 may indicate that the object is further away from the camera or screen, or if the Reverse-Z algorithm is being employed by the application, a smaller depth value 158 may indicate that the object is further away from the camera.

The depth renderer 154 may omit some scene objects from the depth-only rendering. In particular, objects that are poor occluders may be omitted from the depth-only rendering. For example, small objects, transparent objects, and objects including holes may not fully occlude an object behind the poor occluder. Poor occluders may also have a greater occlusion effect than is desired, due to low resolution and undersampling, resulting in an incorrect image. That is, pixels behind the poor occluder may be culled based on depth, resulting in missing pixels being visible adjacent or through the poor occluder. Poor occluders may be identified by the number of covered pixels, by their projected screen space area, by being manually excluded from the occlusion render or by other means. Accordingly, the depth renderer 154 may omit poor occluders from the depth-only rendering, but such poor occluders may be included in a full resolution rendering process.

The sampler 156 may sample depth values 158 of the occlusion geometry 155 for pre-populating the hierarchical depth buffer 130, metadata 132, or full resolution depth data 136 of the GPU depth data 129. In an implementation, the sampler 156 may be biased to generate a conservative depth sample value. That is, the sampler 156 may generate a further depth value to prevent improper culling of pixels that may be close to the occlusion geometry 155. For example, the sampler 156 may use techniques such as a global bias, rounding bias and per sample bias to conservatively bias the depth samples while remaining close to the actual depth value of the occlusion geometry 155 in order to gain the benefits of culling. Per sample bias may include taking the furthest depth of neighbouring pixels and their phantom points. These sampling techniques are described in further detail below with respect to FIGS. 5-9.

Figure 2:
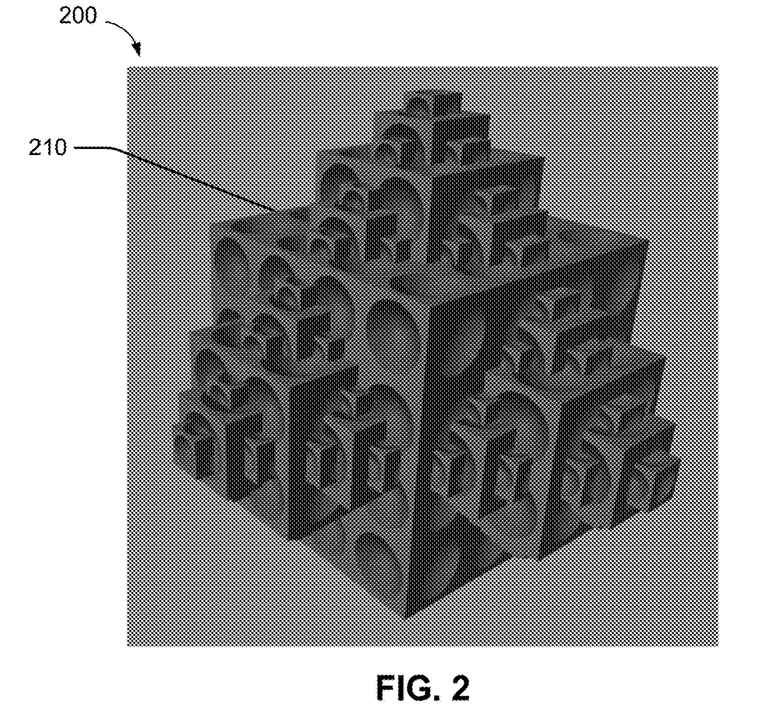
FIG. 2 is a rendered image of an example object.

Referring now to FIG. 2, an example image 200 represents an example object 210 that may be rendered via a GPU 120. The object 210 may have a geometry that may be subject to overdraw and may consume significant graphical processing resources. For example, the illustrated object 210 may be a fractal object composed of multiple cubes having semi-spherical indentations in the surfaces. The spherical indentations may be a texture based effect that is not present in the underlying object. As illustrated, surfaces of the cubes overlap the surfaces of other cubes often resulting in the visible portion of each cube being a rectangular prism. Accordingly, if every surface is rendered, the GPU 120 may perform significant overdrawing of previously rendered pixels. Additionally, a full resolution depth pre-pass would still include rendering every cube. A bounding volume software occlusion culling may not be particularly useful since each cube blocks only a portion of other cubes, therefore, the software occlusion culling may cull few cubes from the rendering process, and a great deal of overdraw may remain.

Figure 3:
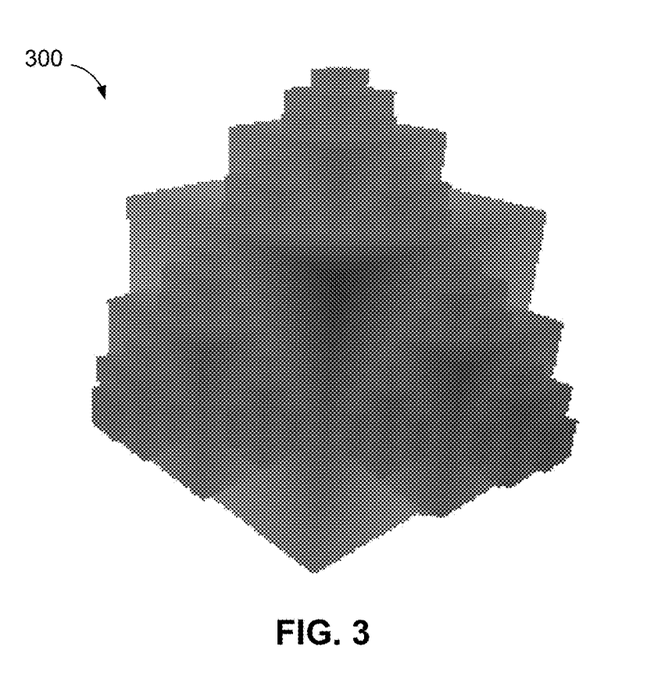
FIG. 3 is a representation of an example occlusion geometry for the example object of FIG. 2, in accordance with an implementation of the present disclosure.

FIG. 3 illustrates an example reduced resolution occlusion geometry 300 of the object 210 (i.e., and example of occlusion geometry 155) that may be generated by a depth renderer 154 of depth pre-pass component 152. The reduced resolution occlusion geometry 300 includes only depth values of the object 210. Pixels that are closer to the camera (less deep) are shown in darker shades, while pixels that are further away from the camera (deeper) are shown in lighter shades.

Figure 4:
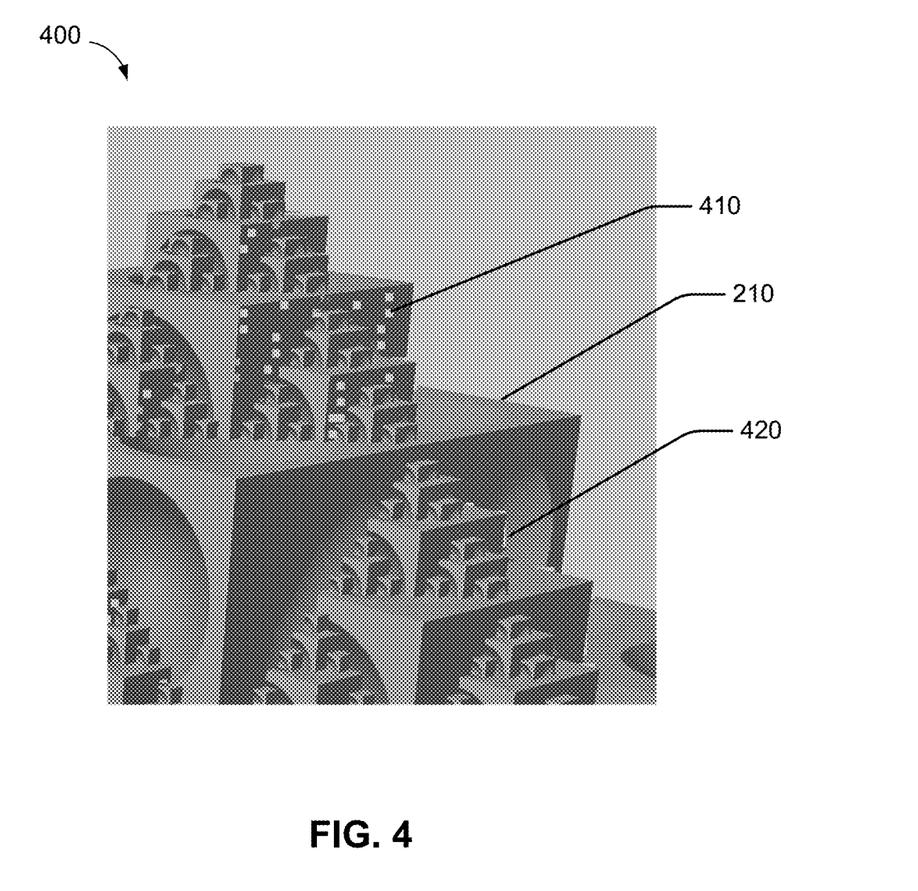
FIG. 4 is a rendered image of the example object of FIG. 2 including missing pixels due to undersampling.

FIG. 4 illustrates an example image 400 of a portion of the object 210. The image 400 may include missing pixels 410, 420 due to undersampling. The missing pixels 410 may be at locations where groups of pixels were culled based on the reduced resolution occlusion geometry 300. Accordingly, when the full resolution rendering process compares the actual farthest point of each tile to the sampled value of the reduced resolution occlusion geometry 300, the sampled point appears to occlude the tile and so the tile is incorrectly culled. Other missing pixels 420 may be due to an edge of a surface not actually occluding a further surface that is adjacent the edge in the 2D image. That is, due to undersampling, the sample value of the closer surface is applied to the adjacent pixel in the high resolution rendering, which appears to be occluded, even though the high resolution rendering does not include a pixel for the closer surface for the adjacent pixel.

Figure 5:
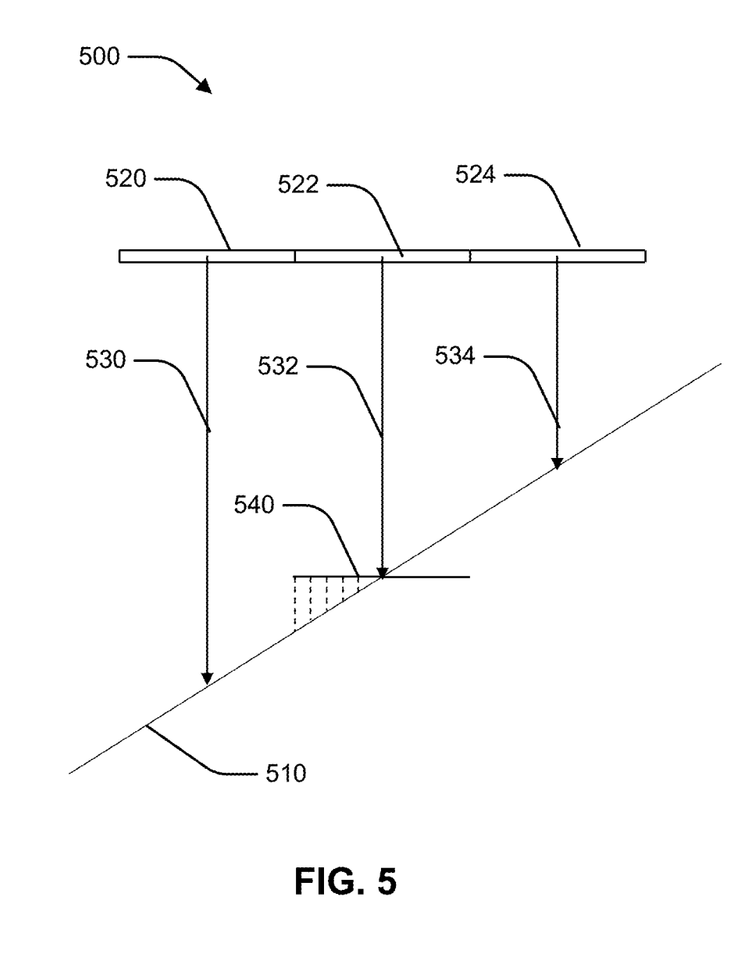
FIG. 5 a conceptual diagram showing a cross-sectional view of an example object being sampled into a low-resolution screen space.

FIG. 5 is a conceptual diagram 500 showing a cross-sectional view of an object 510 being sampled into a low-resolution screen space. The low-resolution screen space may be represented by pixels 520, 522, 524. A full-resolution screen space may be presented by pixels 540. The object 510 may have a slope such that the depth of the object 510 varies when sampled at different locations corresponding to the pixels 520, 522, 524, to obtain depth values 530, 532, 534. When the depth values 530, 532, 534 are used by the occlusion culling component 134 of the GPU 120 to cull pixels 540 in the full-resolution screen space, the depth value 532 may represent pixels 540 that actually correspond to a different depth. For purposes of culling, a portion of the object 510 that is closer than the depth value 532 will not be culled, but a pixel 540 corresponding to a portion of the object 510 that is further than the depth value 532 may be culled because the occlusion culling component 134 may determine that the portion of the object is occluded by the pixel corresponding to depth value 532, even though the depth value 532 and the pixel 540 may represent the same surface of the object 510. This improper culling may result in the missing pixels 410, 420.

Figure 6:
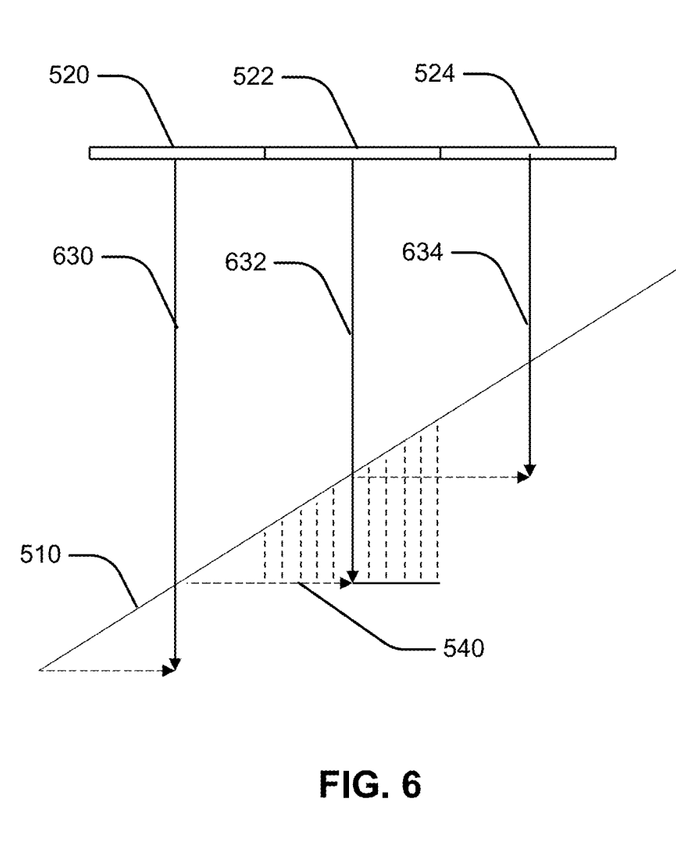
FIG. 6 is a conceptual diagram showing an example per sample biasing technique for sampling the object of FIG. 5 into the low-resolution screen space, in accordance with an implementation of the present disclosure.

FIG. 6 is a conceptual diagram 600 showing an example per sample biasing technique for sampling the object 510 into the low-resolution screen space. The per sample biasing technique may assign a farthest sampled depth value of the corresponding pixel 522 and up to eight adjacent pixels to the depth value 622. In this cross-sectional view only two adjacent pixels are illustrated. For example, the depth value 632 may be set to the greatest depth value of samples at pixels 520, 522, and 524, which is the depth value 630 at the pixel 520 in this example. Accordingly, by assigning the depth value at the pixel 520 to the depth value 632, the stored value may be further than the surface of object 510 for each pixel 520, 522, and 524. Therefore, none of the illustrated full-resolution pixels 540 would be culled when using per sample biasing.

Figure 7:
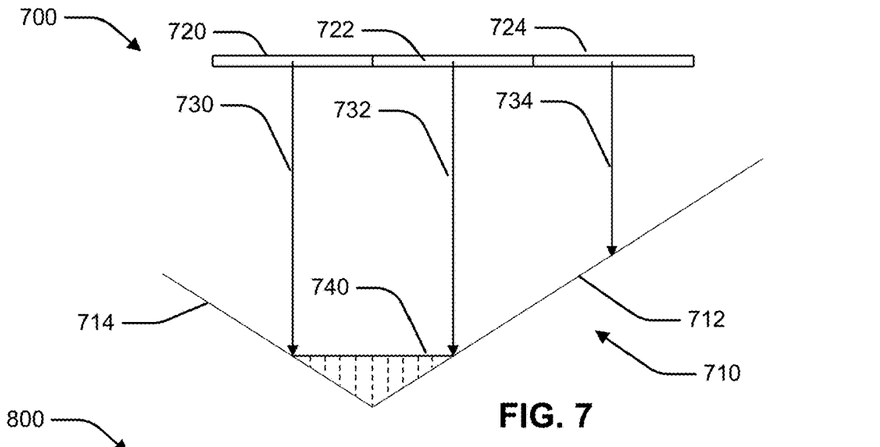
FIG. 7 a conceptual diagram showing a cross-sectional view of an example concave object being sampled into a low-resolution screen space.

FIG. 7 is a conceptual diagram 700 showing a cross-sectional view of an object 710 being sampled into a low-resolution screen space. The low-resolution screen space may be represented by pixels 720, 722, and 724. A full-resolution screen space may be presented by pixels 740. The object 710 may have a convex surface defined by surface 712 and surface 714. Accordingly, when the depth values 730, 732, 734 corresponding to pixels 720, 722, 724, respectively, are sampled, there is a chance that the surface of object 710 is further than any depth value 730, 732, 734 for some full-resolution pixels 740. Therefore, the per sample biasing technique of taking the furthest depth of the set of neighboring depths may not prevent some full-resolution pixels 740 from being improperly culled.

Figures 8, 9:
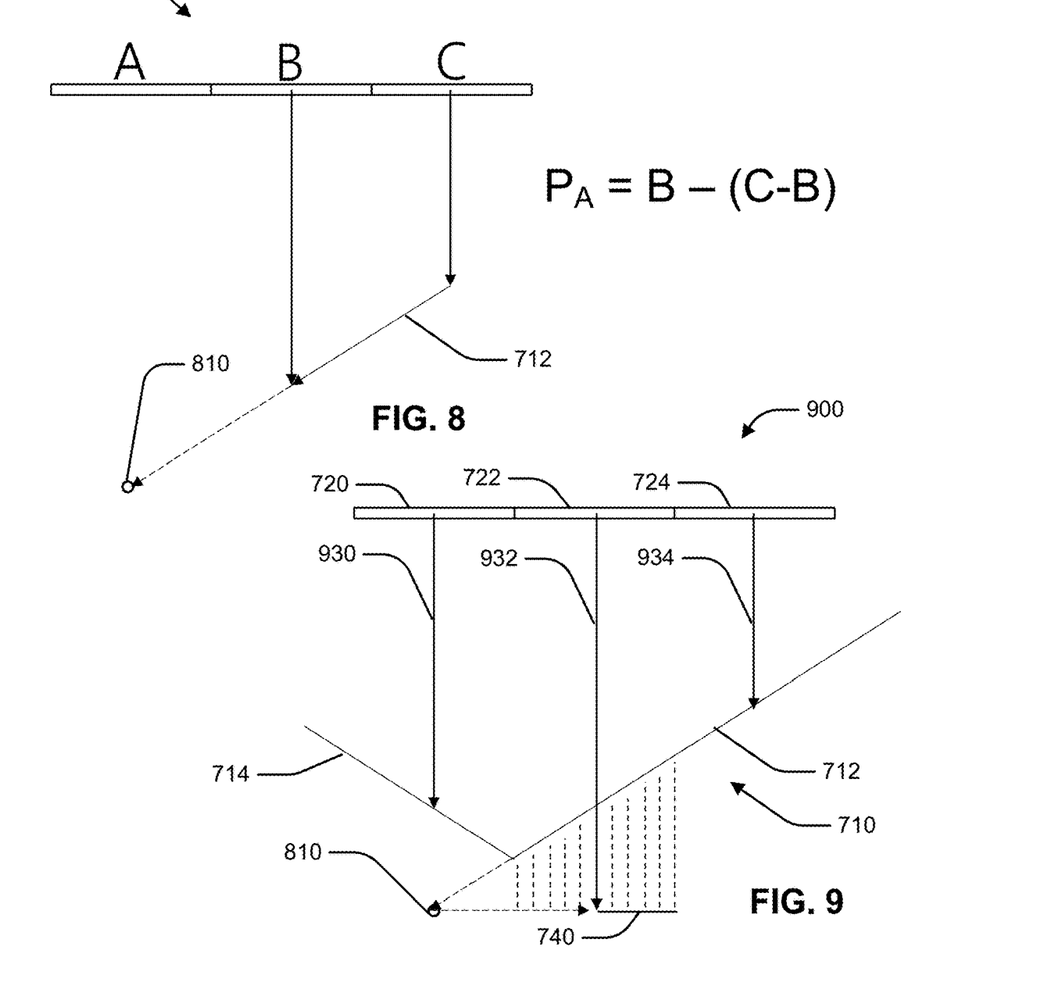
FIG. 8 is a conceptual diagram showing an example phantom point biasing technique, in accordance with an implementation of the present disclosure.
FIG. 9 is a conceptual diagram showing the example phantom point biasing technique for sampling the object of FIG. 7 into the low-resolution screen space, in accordance with an implementation of the present disclosure.

FIG. 8 is a conceptual diagram showing an example per sample biasing technique using phantom points. A phantom point may be a point corresponding to a surface that extends beyond an edge of the surface. For example, the phantom point 810 may correspond to the surface 712. The sampler 156 may determine phantom points for each pixel 720, 724 adjacent a pixel 722 being sampled based on a depth of the pixel 722 being sampled and a pixel 724 opposite the phantom point 810 using a simplified slope calculation. That is, since the two adjacent pixels 720, 724 are equidistant from the pixel 722 being sampled, the depth of the phantom point 810 may be the depth of the depth value 732 minus the difference between the depth value 732 and the depth value 734 at the opposite pixel 724. That is, as illustrated in FIG. 8, the depth value for the phantom point for pixel A ($P_A$)=B−(C−B).

FIG. 9 is a conceptual diagram showing biasing using phantom points applied to the object 710. As in FIG. 8, the phantom point 810 may correspond to the surface 712. The depth value 932 of the pixel 722 may be set to the farthest of the depth of the pixel 722, the depth of the eight neighbor pixels (e.g., pixels 720 and 724), and the depth of any phantom points (e.g., phantom point 810). Accordingly, in this example, the sample depth value 932 may be set to the depth of phantom point 810. In an implementation, only phantom points corresponding to a surface sampled for the pixel being sampled may be determined for the pixel being sampled. For example, the sampler 156 may not determine a phantom point corresponding to the surface 714 for the pixel 722 because the pixel 722 does not correspond to the surface 714. The sampler 156 may, however, determine a phantom point for the surface 714 when determining the sample depth value 930. The depth of the object 710 for each of the full-resolution pixels 740 may be closer than the depth value 932 based on phantom point 810, so each of the pixels 740 would be drawn based on the object 710.

Additional biasing techniques that may be used include a global bias that applies an offset to each depth sample. While a global bias reduces improper culling, a global bias may also reduce desirable culling and associated processing savings. Another example biasing technique is biased rounding. The hierarchical depth buffer 130 and metadata 132 may have a limited precision. Accordingly, when sampling a depth value, the sampler 156 may need to round to a discrete value to be stored in the hierarchical depth buffer 130. Therefore, the sampler 156 may always round to a further depth value when sampling the reduced resolution occlusion geometry 155.

Figure 10:
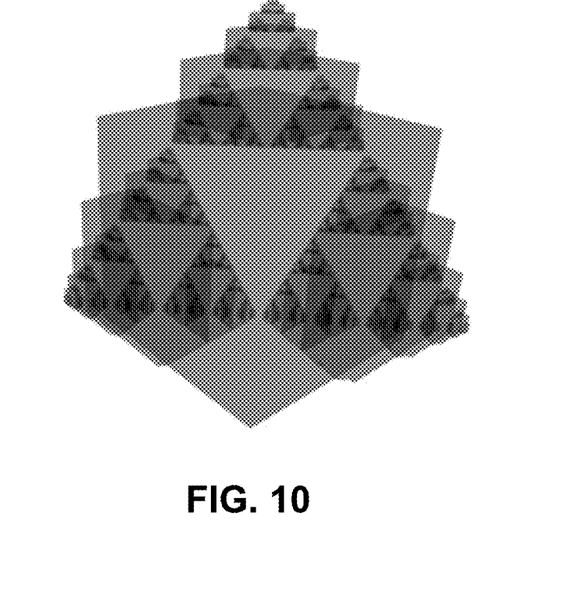
FIG. 10 is a diagram showing overdraw when rendering the example object of FIG. 2.

FIG. 10 is a diagram 1000 showing overdraw when rendering the object 210 without pre-populating the hierarchical depth buffer 130. The darker shades indicate that the pixels were overdrawn more times. As illustrated, the surfaces of the smaller rectangular prisms are overdrawn multiple times.

Figure 11:
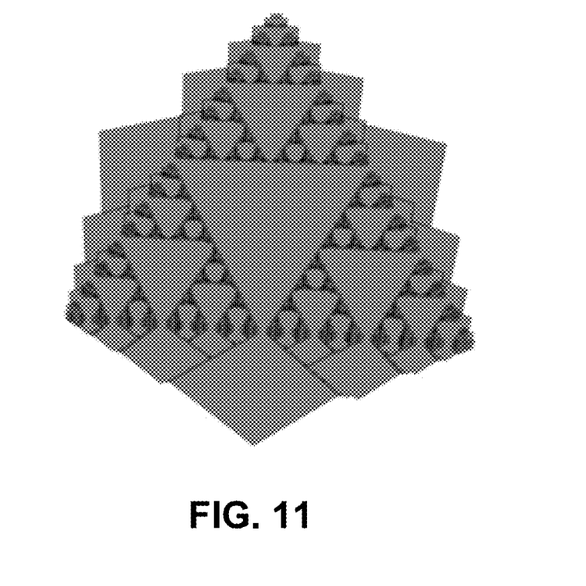
FIG. 11 is a diagram showing overdraw after pre-populating a hierarchical depth buffer using a low-resolution depth pre-pass, in accordance with an implementation of the present disclosure.

In contrast, FIG. 11 is a diagram 1100 showing overdraw when rendering the object 210 after pre-populating the hierarchical depth buffer 130 using a low-resolution depth pre-pass. In this example, the depth renderer 154 only rendered four of the six iterations of the cubes in the fractal object 210. As illustrated, the overdraw occurs mostly for the surfaces of the cubes that were not rendered in the depth pre-pass. There is also some overdraw along the edges of the rectangular prisms where the biasing conservatively samples neighbor pixels corresponding to the further object along an edge of the closer object. Accordingly, some of the occluded pixels along the edge are drawn multiple times. Overall, however, the overdraw is greatly reduced using the low-resolution depth pre-pass.

Figure 12:
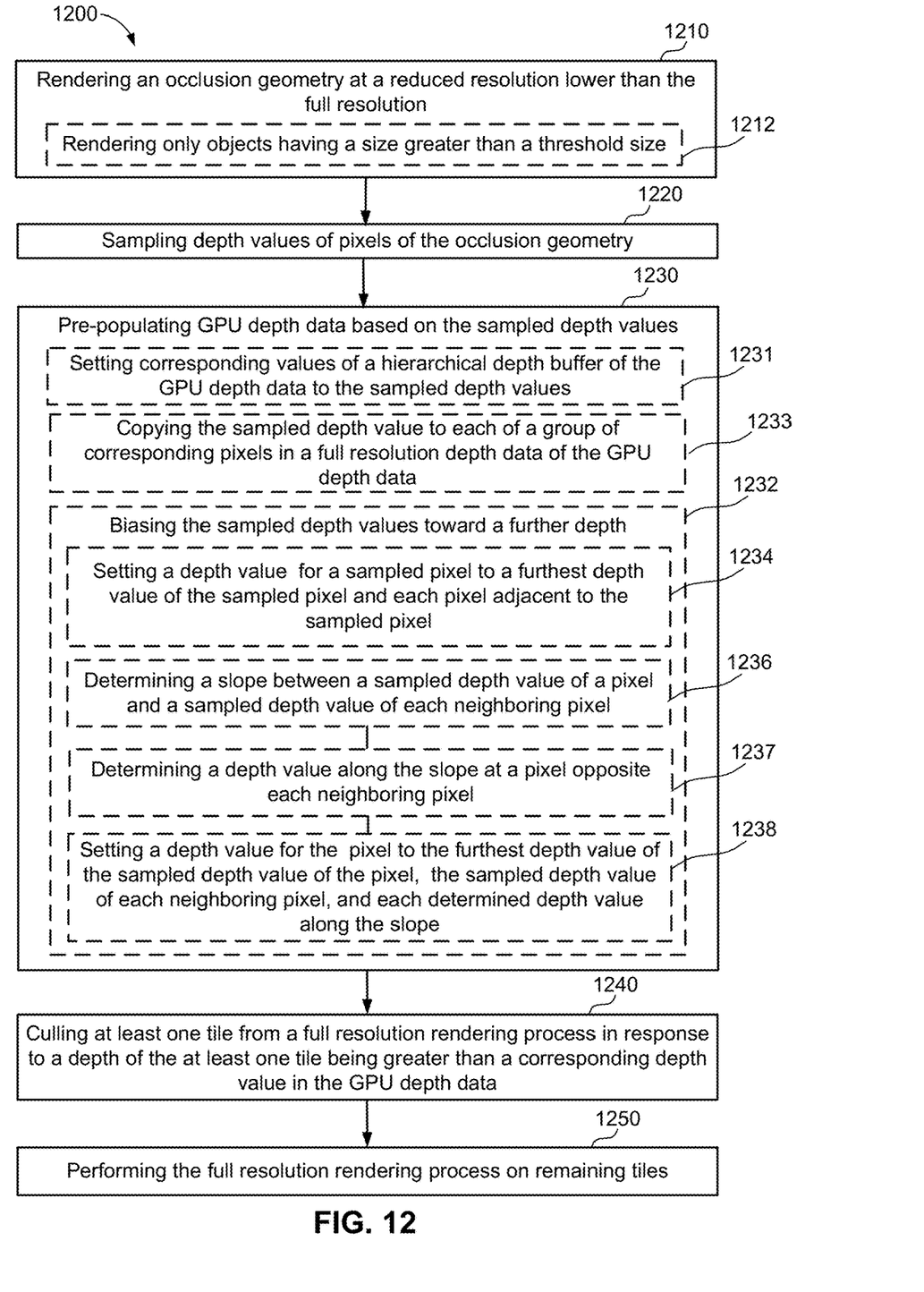
FIG. 12 is flowchart of an example method of drawing an image by culling occluded pixels from a graphics pipeline using a low resolution depth pre-pass, in accordance with an implementation of the present disclosure.

Referring now to FIG. 12, an example method 1200 provides for the computer device 110 to render a full-resolution image using a low-resolution depth pre-pass. For example, method 1200 may be performed by an application 150 executing on a CPU 114 and performing graphics processing using a GPU 120.

In block 1210, the method 1200 may include rendering an occlusion geometry at a reduced resolution lower than the full resolution. For instance, the application 150 may execute the depth renderer 154 to render the occlusion geometry 155 (e.g., reduced resolution occlusion geometry 300) at a reduced resolution lower than the full resolution. The depth renderer 154 may render the occlusion geometry 155 either on the CPU 114 or the GPU 120. The reduced resolution may be a fraction of the full resolution. In one implementation, the reduced resolution may be one-eighth of the full resolution. For example a 4 k frame (3840×2160 pixels) may use a reduced resolution of 270p (480*270). In this case, one pixel of the occlusion geometry 155 may correspond to one tile of the full resolution. Other resolutions may also be selected, based on, for example, the available processing resources of the CPU 114 or the GPU 120.

At block 1212, the block 1210 may include rendering only objects having a size greater than a threshold size. For instance, the depth renderer 154 may choose to render only objects having a size greater than a threshold size. For example 5% of screen area. In another example, the threshold size may be at least two pixels per triangle at the reduced resolution, which may result in at least two samples of the object such that a slope of the object may be determined.

At block 1220, the method 1200 may include sampling depth values of pixels of the occlusion geometry. For instance, the sampler 156 may sample the depth values of pixels of the occlusion geometry 155. In an implementation, the sampling count may correspond to a structure of the hierarchical depth buffer 130. For example, if the hierarchical depth buffer 130 includes metadata 132 for 8×8 tiles, one sample per tile may be used. Accordingly, when the reduced resolution is one-eighth, each pixel may correspond to a tile sample. However, other groupings of hierarchical depth buffer 130 or different resolution ratios may be used and sampled appropriately.

At block 1230, the method 1200 may include pre-populating GPU depth data based on the sampled depth values. For instance, in an implementation, an application 150 may execute the depth pre-pass component 152 to pre-populate the GPU depth data 129. The pre-populated GPU depth data 129 may include the hierarchical depth buffer 130 which may be combined with other depth metadata 132. For example, at block 1231, the block 1230 may include setting corresponding values of a hierarchical depth buffer of the GPU depth data to the sampled depth values. For instance, the depth pre-pass component 152 may set the minimum and maximum depth values for a tile in the hierarchical depth buffer 130 to the sampled depth value. In another implementation without a hierarchical depth buffer 130 or with no direct access to the hierarchical depth buffer 130, the sampler 156 may sample the occlusion geometry 155 and the depth pre-pass component 152 may directly populate the full resolution depth data 136. For example, at 1233, the block 1230 may include copying the sampled depth value to each of a group of corresponding pixels in a full resolution depth data of the GPU depth data. For instance, the depth pre-pass component 152 may copy the sampled depth value to each of a group of corresponding pixels in the full resolution depth data 136 of the GPU depth data 129. In the case where the reduced resolution is one-eighth of the full resolution, the depth pre-pass component 152 may copy the sampled value of a low resolution pixel to each pixel of an 8×8 group of corresponding full resolution pixels.

In block 1232, the block 1230 may include biasing the sampled depth values toward a depth value further from the camera. For instance, the depth pre-pass component 152 or sampler 156 may bias the sampled depth values toward a further depth. For a first example biasing technique, at block 1234, biasing the sampled depth values may include setting a depth value of the hierarchical depth buffer 130 for a pixel to the furthest depth value of the pixel and each pixel adjacent to the pixel. For instance, the depth pre-pass component 152 or sampler 156 may set a depth value (e.g., depth value 532) of the hierarchical depth buffer 130 for a pixel (e.g., pixel 522) to a greatest depth value of the pixel 522 and each pixel adjacent to the pixel (e.g., pixels 520 and 522). For non-edge pixels, there may be eight adjacent pixels.

For a second example biasing technique, at block 1236, biasing the sampled depth values may include determining a slope between a sampled depth value of a pixel and a sampled depth value of each neighboring pixel. For instance, the depth pre-pass component 152 or sampler 156 may determine the slope between the sampled depth value 732 of the pixel 722 and the sampled depth value 734 of each neighboring pixel 724. The slope may be based on a difference of the sampled depth values and a uniform pixel size. At block 1237, biasing the sampled depth values may include determining a depth value along the slope at a pixel opposite each neighboring pixel. For instance, the depth pre-pass component 152 or sampler 156 may determine a depth value 930 along the slope at a pixel 720 opposite each neighboring pixel 724 (e.g., at phantom point 810). At block 1238, biasing the sampled depth values may include setting a depth value of the hierarchical depth buffer metadata for a pixel to the furthest depth value of the sampled depth value of the pixel, the sampled depth value of each neighboring pixel, and each extrapolated depth value along the slope. For instance, the depth pre-pass component 152 or sampler 156 may set the depth value of the hierarchical depth buffer 130 for a pixel 722 to the furthest depth value of the sampled depth value 732 of the pixel, the sampled depth value 730, 734 of each neighboring pixel, and each extrapolated depth value 930 along the slope.

At block 1240, the method 1200 may include culling at least one tile or pixel from a full resolution rendering process in response to a depth of the at least one tile or pixel being further than a corresponding depth value in the GPU depth data 129. In an implementation, for example, the GPU 120 may cull at least one tile or pixel from a full resolution rendering process in response to a depth of the at least one tile or pixel being further than a corresponding depth value in the GPU depth data 129. In an implementation, the GPU 120 may perform the culling automatically in response to a request from the application 150 or display controller 142 to perform the full resolution rendering.

At block 1250, the method 1200 may include performing the full resolution rendering process on remaining tiles or pixels to generate the image at the full resolution. For instance, the GPU 120 may use the render pipeline 126 to perform the full resolution rendering process on the remaining tiles or pixels (e.g., the tiles or pixels that are not culled). The GPU 120 may display the image on the computer display 112 at the full resolution.

Figure 13:
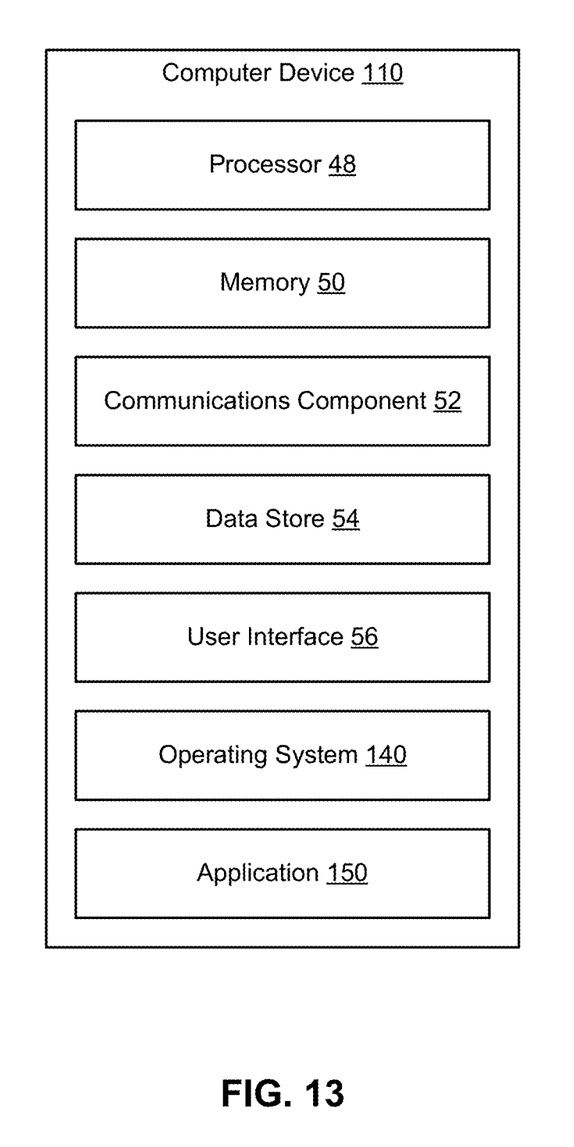
FIG. 13 is a schematic block diagram of an example computer device in accordance with an implementation of the present disclosure.

Referring now to FIG. 13, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114 and/or GPU 120. In an example, computer device 110 may include memory 50 for storing instructions executable by the processor 48 for carrying out the functions described herein. In an implementation, for example, memory 50 may include memory 116 and/or memory 122.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 (FIG. 1) and/or applications 150 (FIG. 1).

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display (e.g., display 112), a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 150. In addition, processor 48 executes operating system 140 and/or application 150, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of rendering an image at a full resolution, comprising:
rendering an occlusion geometry for the image at a reduced resolution lower than the full resolution, wherein rendering an occlusion geometry comprises rendering only objects having a size greater than a threshold size;
sampling a depth value of pixels of the occlusion geometry;
pre-populating graphics processing unit (GPU) depth data based on the sampled depth values;
culling at least one tile or pixel from a full resolution rendering process in response to a depth of the at least one tile or pixel being further than a corresponding depth value in the GPU depth data;
performing the full resolution rendering process on remaining tiles or pixels to generate the image at the full resolution, wherein objects excluded from rendering the occlusion geometry are included when performing the full resolution rendering process; and
displaying the image on a computer display at the full resolution.

2. The method of claim 1, wherein pre-populating the GPU depth data based on the sampled depth values comprises biasing the sampled depth values toward a further depth.

3. The method of claim 2, wherein biasing the sampled depth values comprises setting a depth value for a sampled pixel to a furthest depth value of the sampled pixel and each pixel adjacent to the sampled pixel.

4. The method of claim 2, wherein biasing the sampled depth values comprises:

determining a respective slope between a sampled depth value of a center pixel and a sampled depth value of each neighboring pixel;

determining a depth value along the respective slope at a pixel opposite each neighboring pixel; and setting a depth value for the center pixel to a furthest depth value of the sampled depth value of the center pixel, the sampled depth value of each neighboring pixel, and the determined depth value along each respective slope.

5. The method of claim 2, wherein biasing the sampled depth values comprises rounding the sampled depth value to a further discrete value of a hierarchical depth buffer of the GPU depth data.

6. The method of claim 1, wherein pre-populating the GPU depth data based on the sampled depth values comprises setting corresponding values for tiles of a hierarchical depth buffer of the GPU depth data to the sampled depth values.

7. The method of claim 1, wherein pre-populating the GPU depth data based on the sampled depth values comprises copying the sampled depth value to each of a group of corresponding pixels in a full resolution depth data of the GPU depth data.

8. The method of claim 1, wherein the threshold size is at least two pixels at the reduced resolution.

9. The method of claim 1, wherein the reduced resolution is one-eighth or less of the full resolution.

10. A computing device for rendering an image at a full resolution, comprising:

a memory storing one or more parameters or instructions for executing an operating system and one or more applications;

a graphics processing unit (GPU) for rendering frames of the one or more applications for display on a display device coupled to the computing device, the GPU including GPU depth data; and at least one processor coupled to the memory, and the GPU, wherein the at least one processor is configured to:

render an occlusion geometry at a reduced resolution lower than the full resolution;

sample a depth value of pixels of the occlusion geometry;

determine a respective slope between a sampled depth value of a center pixel and a sampled depth value of each neighboring pixel;

determine a depth value along the respective slope at a pixel opposite each neighboring pixel; and set a depth value of the GPU depth data corresponding to the center pixel to a furthest depth value of the sampled depth value of the center pixel, the sampled depth value of each neighboring pixel, and the determined depth value along each respective slope; and pre-populate the GPU depth data based on the sampled depth values, wherein the processor is configured to bias the sampled depth values toward a further depth for pre-populating the GPU depth data wherein the GPU is configured to:

cull at least one tile or pixel from a full resolution rendering process in response to a depth of the at least one tile or pixel being further than a corresponding depth value in the GPU depth data; and perform the full resolution rendering process on remaining tiles or pixels to generate the image at the full resolution.

11. The computing device of claim 10, wherein the processor is configured to bias the sampled depth values toward a further depth for pre-populating the GPU depth data.

12. The computing device of claim 11, wherein the processor is configured to set a depth value of the GPU depth data corresponding to a sampled pixel to a furthest depth value of the sampled pixel and each pixel adjacent to the sampled pixel.

13. The computing device of claim 11, wherein the processor is configured to add an offset to each sampled depth value.

14. The computing device of claim 10, wherein the GPU depth data includes hierarchical depth buffer metadata for tiles and the at least one processor is configured to set corresponding minimum and maximum depth values for the tiles of the hierarchical depth buffer metadata to the sampled depth values.

15. A non-transitory computer-readable medium, comprising code executable by one or more processors for rendering an image at a full resolution, the code comprising code for:

rendering an occlusion geometry at a reduced resolution lower than the full resolution, wherein rendering an occlusion geometry comprises rendering only objects having a size greater than a threshold size;

sampling depth values of pixels of the occlusion geometry;

biasing the sampled depth values toward a further depth;

pre-populating a hierarchical depth buffer based on the biased depth values;

culling at least one tile or pixel from a full resolution rendering process in response to a depth of the at least one tile or pixel being further than, a corresponding depth value in the hierarchical depth buffer; and performing the full resolution rendering process on remaining tiles or pixels to generate the image at the full resolution, wherein objects excluded from rendering the occlusion geometry are included when performing the full resolution rendering process.

16. The non-transitory computer-readable medium of claim 15, wherein biasing the sampled depth values comprises setting a depth value of the hierarchical depth buffer for a pixel to a furthest depth value of the pixel and each pixel adjacent to the pixel.

17. The non-transitory computer-readable medium of claim 15, wherein biasing the sampled depth values comprises:

determining a respective slope between a sampled depth value of a center pixel and a sampled depth value of each neighboring pixel;

determining a depth value along the respective slope at a pixel opposite each neighboring pixel; and setting the depth value of the hierarchical depth buffer for the center pixel to a furthest depth value of the sampled depth value of the center pixel, the sampled depth value of each neighboring pixel, and the determined depth value along each respective slope.

* * * * *